Sept. 17, 1963 K. H. HORN ET AL 3,104,282

PRINTED CIRCUIT PANEL WITH PLUG-IN CONNECTORS

Filed April 6, 1960 4 Sheets-Sheet 1

INVENTORS
Karl H. Horn
Bernard Shlachter,
By Mueller & Aichele
Attys.

PRINTED CIRCUIT PANEL WITH PLUG-IN CONNECTORS

Filed April 6, 1960 4 Sheets-Sheet 2

INVENTORS.
Karl H. Horn
Bernard Shlachter,
By Mueller & Aichele Atty's.

Sept. 17, 1963 K. H. HORN ET AL 3,104,282

PRINTED CIRCUIT PANEL WITH PLUG-IN CONNECTORS

Filed April 6, 1960 4 Sheets-Sheet 3

INVENTORS.
Karl H. Horn,
Bernard Shlachter,
By Mueller & Aichele
Attys.

PRINTED CIRCUIT PANEL WITH PLUG-IN CONNECTORS

Filed April 6, 1960 4 Sheets-Sheet 4

INVENTORS.
Karl H. Horn
Bernard Shlachter,
By Mueller & Aichele
Att'ys.

3,104,282

PRINTED CIRCUIT PANEL WITH PLUG-IN CONNECTORS

Karl H. Horn, Elmwood Park, and Bernard Shlachter, Morton Grove, Ill., assignors to Motorola, Inc., Chicago, Ill., a corporation of Illinois Filed Apr. 6, 1960, Ser. No. 20,440
7 Claims. (Cl. 178—7.8)

This invention relates to electronic chassis assemblies and more particularly to an easily serviced, compact television receiver of improved mechanical construction.

In recent years much emphasis has been placed on the building of less expensive television receivers in compact form and of reduced weight. One design feature tending to provide such receivers has been a plated chassis panel. However, with this approach considerable difficulty was experienced in obtaining the necessary structural ruggedness and desirable ease of circuit service or repair. In general, some of the components of a television receiver have tended to cause mechanical breakdown of the chassis panel and the close spacing of component circuitry has increased the difficulty of circuit tracing and testing, as well as component replacement. In the usual prior art television receivers having plated chassis panels, the components on the panel have obstructed the conductors from observation for circuit tracing and much study was necessary to follow a circuit and use test procedures. Moreover, removal of such a panel for repair purposes has often been a time consuming task involving the unsoldering of many connections. Of course, such problems of panel breakdown and increased difficulty of repair pose cost and performance problems to the user of such a receiver and they tend to offset advantages of the size and weight reductions and the original cost savings generally attributed to receivers of the type described.

An object of the present invention is to provide an improved television receiver of reduced weight, compact form, and of substantial mechanical construction to withstand portable use.

Another object is to provide a television receiver having a plated circuit panel removably fixed within a receiver housing and constructed in a manner to permit convenient, unobstructed circuit tracing and to facilitate gaining access to test points of the receiver circuit.

Another object is to provide a television receiver having a chassis which may be rapidly released from the receiver as a unit for repair and which may be removed while connected to the receiver for complete accessibility and testing of a fully energized receiver.

A further object is to provide a television receiver having a plated circuit panel carrying a majority of the receiver stages and which panel is completely coupled to circuitry external to it through plug-type, non-solder connections.

A still further object is to provide a compact housing and frame structure for a television receiver which may be easily and rapidly disassembled to promote accessibility to the various receiver components.

A feature of the invention is the provision of a main frame support for power supply and tuner sections of a television receiver and for further retaining a plated circuit panel assembly removably fastened to an open portion of the frame thereby giving mechanical support to the panel and permitting access to the circuitry thereof while the panel is mounted.

Another feature is the provision of an improved frame support for a plated circuit chassis panel of a television receiver having affixed thereto a plurality of multi-connectors coupled to further receiver sections and engageable with conductors of the panel to complete the connections among various receiver sections thereby forming a removable receiver chassis requiring no unsoldering for removal.

Still another feature of the invention is the provision of a supporting frame portion and multi-connectors for a plated circuit panel and including manually operable level actuated slides for disengaging the panel and multi-connectors to expedite panel removal.

Still another feature of the invention is the provision of a single plated circuit panel for an easily serviced television receiver carrying approximately 80 percent of the receiver components all arranged on one side of the panel and having color coded circuit connections traced on both panel surfaces thereby facilitating circuit tracing and providing extremely convenient testing of the circuit exposed on the panel.

Still another feature of the invention is the provision of a television receiver assembly having separate groups of relatively heavy receiver components all cable connected to respective associated multi-connectors and a plated circuit panel assembly for a majority of the remainder of the receiver sections and with the multi-connectors and panel assembly removably affixed to a supporting frame so that the panel and multi-connectors can be released to form a disassembled, operative receiver, or the panel assembly can be released as a unit to facilitate component replacement.

Figures 4, 4A, 9:
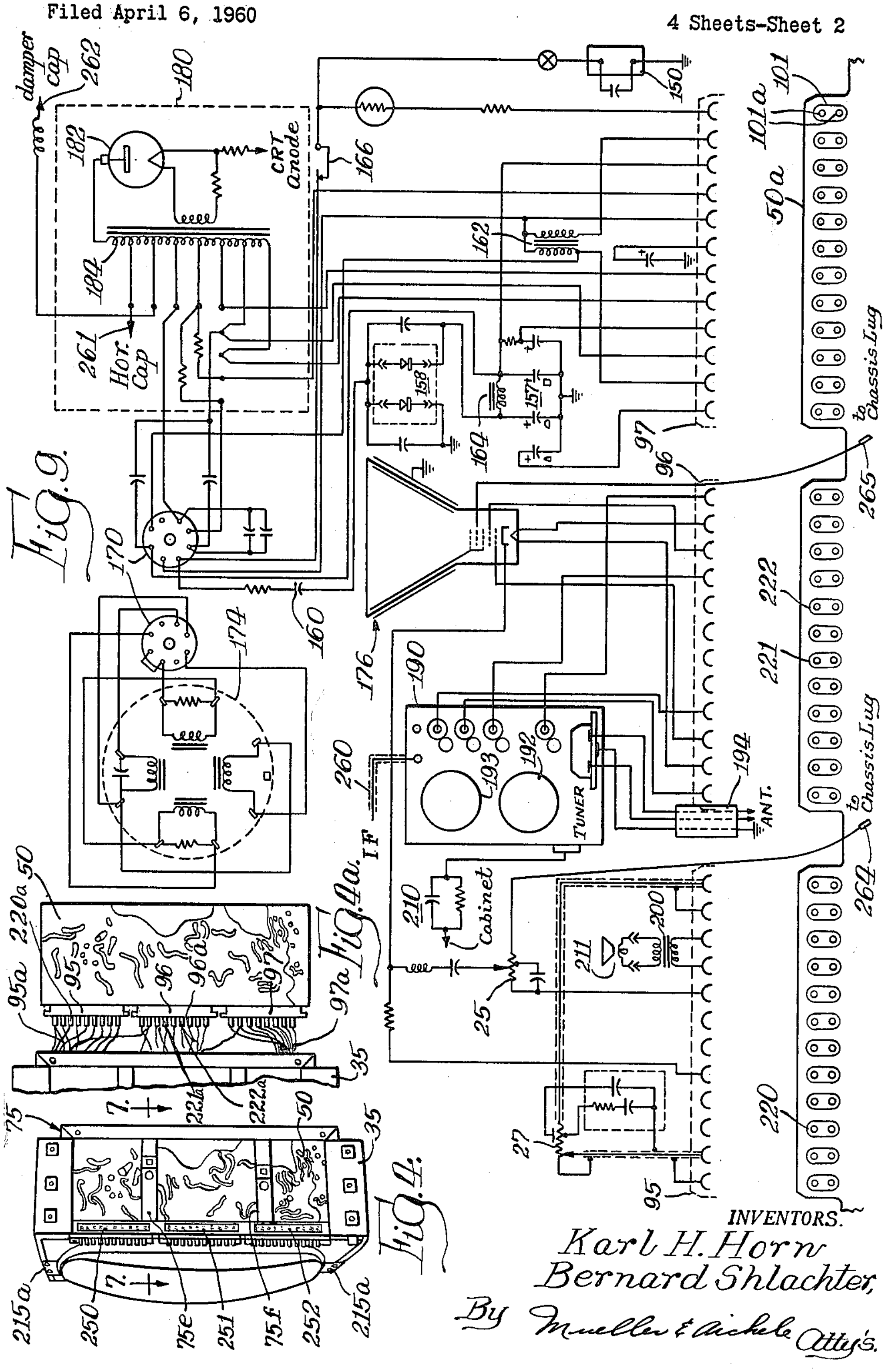
FIG. 4 is a bottom perspective view of the receiver as in FIG. 3.
Figures 5, 6, 7, 8, 8A:
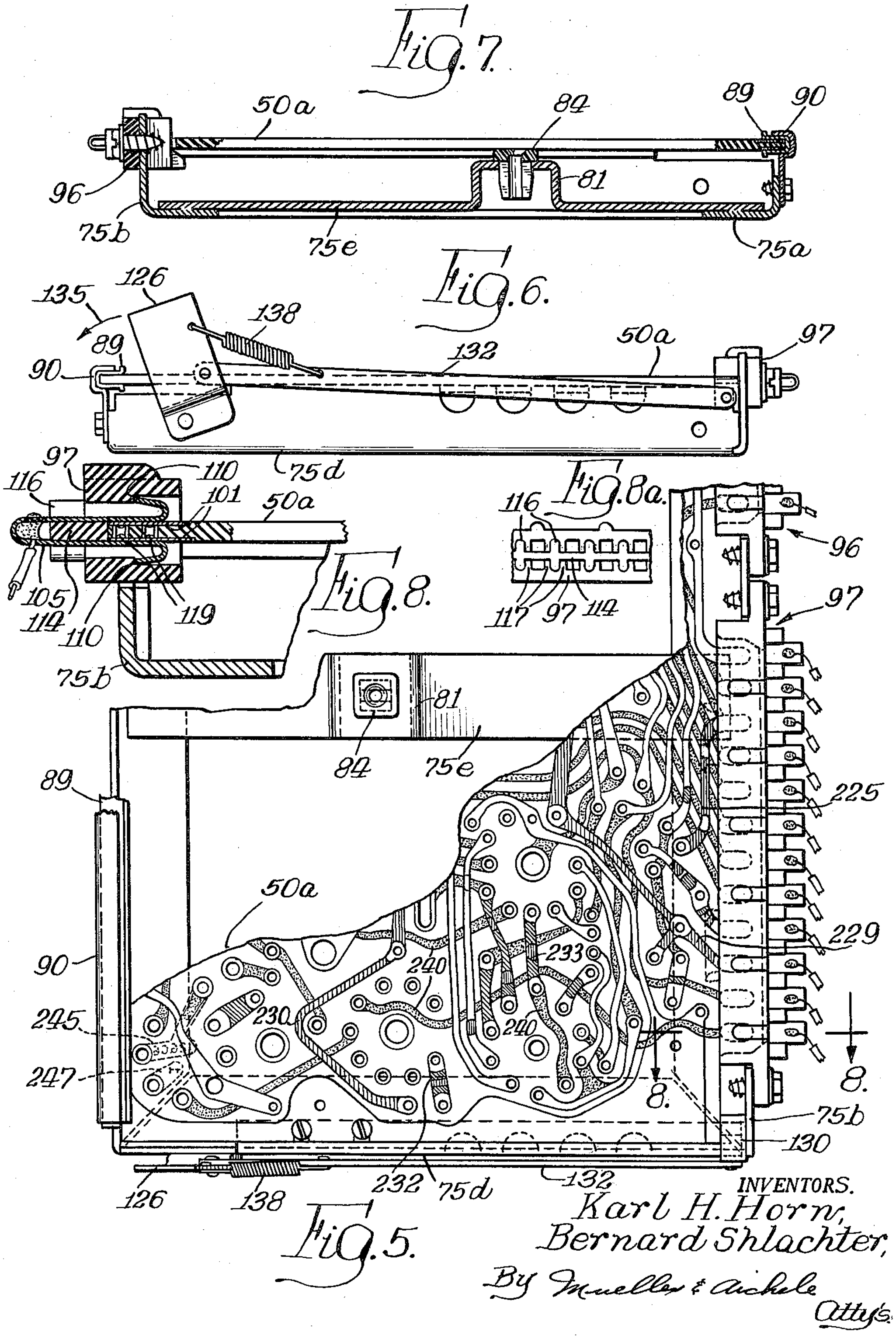
Figure 10:
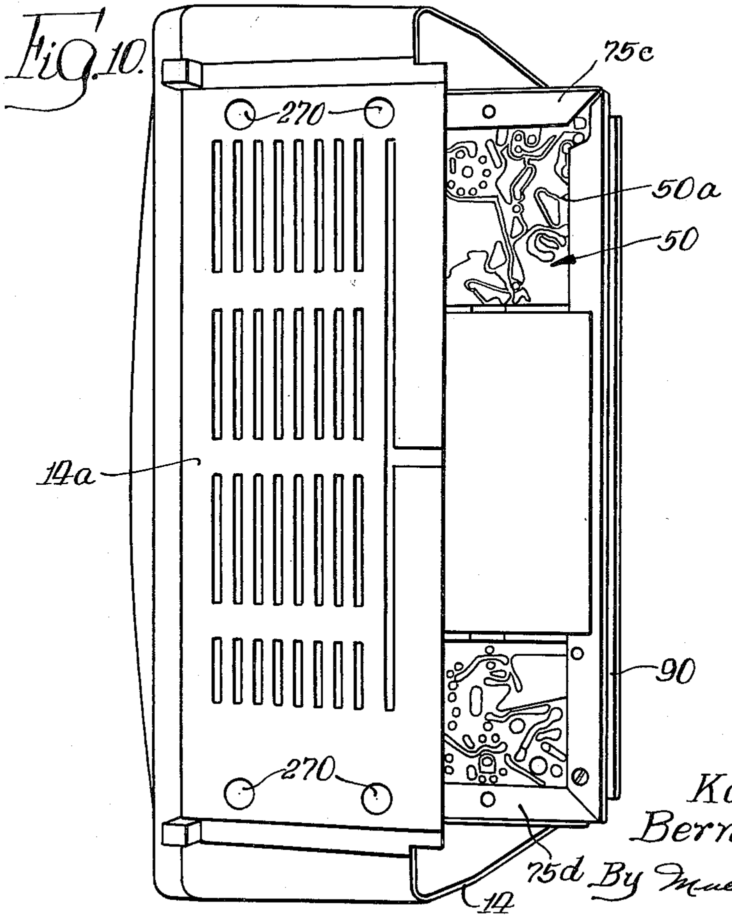

FIG. 4*a* is a partial view as in FIG. 4 but with the plated circuit panel assembly and multi-connectors removed but connected for receiver operation;

FIG. 5 is a top view of a portion of the plated circuit panel and supporting frame therefor (without circuit components);

FIG. 6 is an end elevational view of the panel and frame of FIG. 5;

FIG. 7 is a sectional view along the line 7—7 of FIG. 4;

FIG. 8 is a sectional view of the multi-connector taken along the line 8—8 of FIG. 5;

FIG. 8*a* is an elevational view of the multi-connector block of FIG. 8 with the clips removed;

FIG. 9 is a schematic diagram of the receiver portion external to the plated circuit panel assembly;

FIG. 10 is a bottom view of the receiver; and

Figure 11:
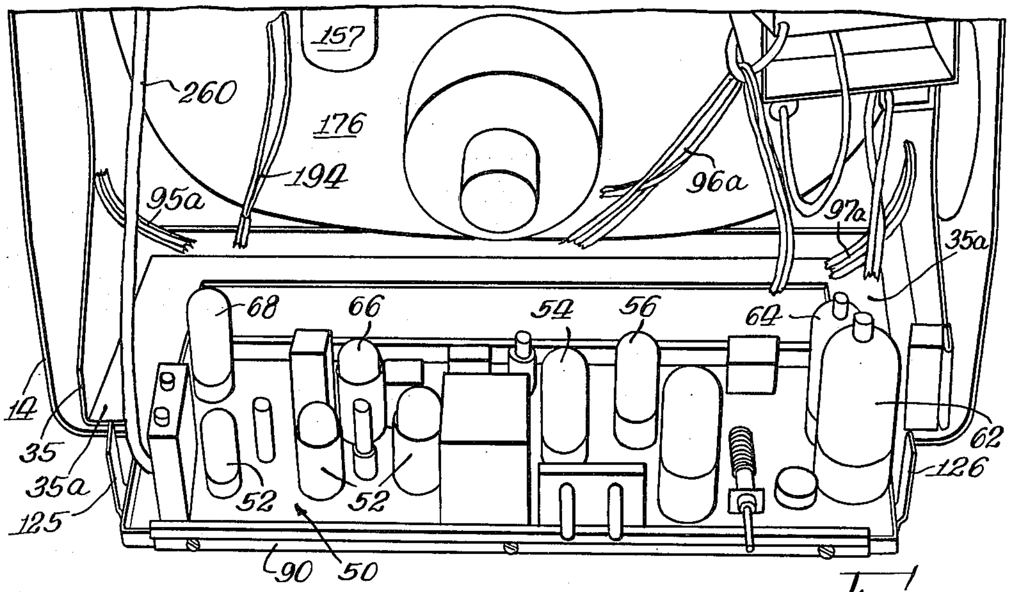

FIG. 11 is a back view of the receiver as in FIG. 10.

In a particular form of the invention, a television receiver includes a main frame support and a housing cabinet which is removably fastened to the frame. A tuner section, a low voltage power supply section and a high voltage power supply section are all carried along a top portion of the frame support. An open frame portion extends along the bottom of the main frame and a plated circuit panel assembly is removably retained thereon.

Approximately eighty percent of the television receiver components are supported on the top side of the panel assembly and these are connected to the remaining sections of the receiver by means of plug-type, non-solder connector receptacles. A plurality of multi-connectors of particular construction extend along the front side of the main frame, and conductors of particular construction along the forward side of the panel assembly are formed to engage the multi-connectors. There are a minimum of additional plug-type connectors also engageable with circuit components carried by the panel assembly so that by separation of these various connectors the entire panel assembly is removable as a unit for inspection or component replacement. A pair of spring loaded, manually operable levers is provided to operate slides engageable with the edges of the panel assembly for effectively disengaging it from the multi-connectors. The plurality of multi-connectors carried by the panel supporting frame are also removable and these are connected through extended cables to the other receiver sections whereby the panel assembly and connectors may be removed from the frame structure in an operable and energizable condition so that testing is greatly facilitated.

The receiver circuit is fully accessible for tube replacement and use of test probes with only the back side removed from the receiver housing. Furthermore, since the panel supporting frame portion is a relatively open structure, the bottom side of the panel assembly is available for test purposes with the receiver housing removed and the panel assembly still retained by the main frame. Since the bottom side of the panel assembly has no components mounted thereon but yet carries a great number of the circuit conductors, and adjacent thereto a plurality of the multi-connectors include exposed conductors, all of these various portions of the circuit are readily available to test probes. In addition, the panel itself has color coded conductors on both sides to facilitate identification of the circuit portions of the receiver and the circuit conductors carried by the panel are traced on each side thereof so that the circuit may be completely traced from one side of the panel and without having to refer to the opposite side of the panel. A more complete description of the exact relationship of the housing cabinet, the frame structure, the panel assembly, and the multi-connector construction, as well as a description of the manually operable mechanism to facilitate panel removal, are all given in greater detail in the following explanation.

*Housing Construction*

Figures 1, 2, 3:
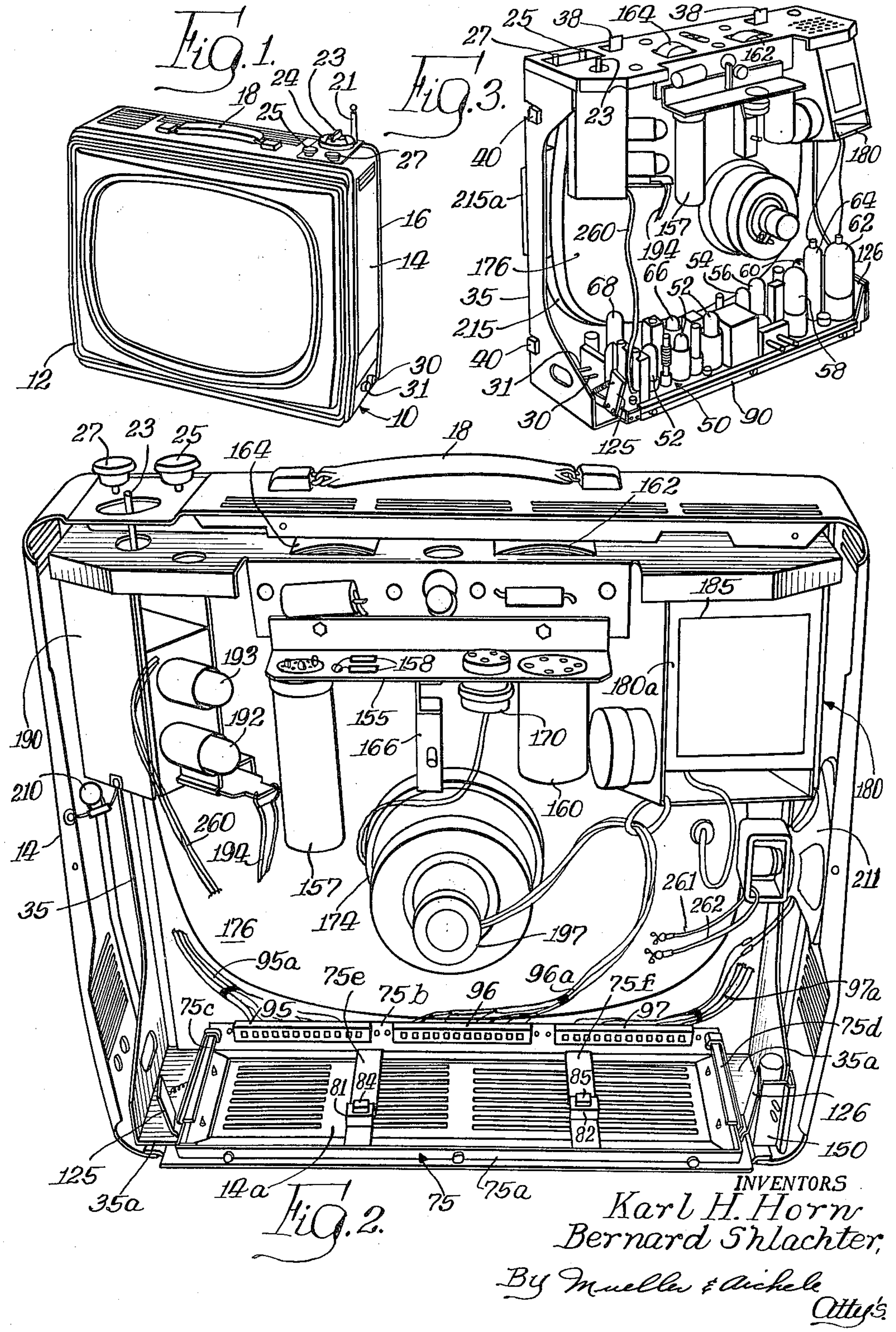
FIG. 1 is a front perspective view of a television receiver constructed in accordance with the invention.
FIG. 2 is a rear view of the receiver of FIG. 1 with the back panel and the chassis panel assembly removed.
FIG. 3 is a rear perspective view of the receiver of FIG. 1 with the housing cabinet removed.

In FIG. 1 the television receiver 10 includes a bezel and safety glass assembly 12 (by which glass the picture tube face is protected), a four sided cabinet portion 14 and an enclosing back 16. There is also a carrying handle 18 on the top of the receiver and an antenna 21 is supported by the back panel 16. Controls of the receiver, including channel selector 23, a fine tuning control 24, a contrast control 25, and an on-off and volume control 27, are all available at the top of the receiver. There are further included a vertical hold control 30 and a brightness control 31 at the lower right side of the receiver. The back panel 16 is affixed to the four sided housing portion 14 by means of threaded fasteners (not shown).

As illustrated in FIGS. 2 and 3, the receiver components are carried by a four sided main frame support 35. The housing portion 14 is secured by its bottom side 14*a* to frame 35 by means of threaded fasteners (not shown) and to the upstanding lugs 38 projecting from the top side of the frame support 35. Support for housing portion 14 by means of lugs 38 provides the necessary strength between the housing and frame support 35 so that the weight of the receiver may be best supported by handle 18. The bezel and safety glass 12 are fastened to the insulator members 40, a pair being on each side of the upright sides of frame support 35. As shown in FIG. 3, the receiver housing has been entirely removed, including the bezel and safety glass 12, the back panel 16 and the four sided housing portion 14.

*Panel Assembly*

The plated circuit panel assembly 50 is positioned along the bottom of frame support 35. As previously stated, eighty to eight-five percent of the receiver circuitry is formed by this panel assembly. The receiver circuit stages and associated components are illustrated in FIG. 3 and these include intermediate frequency amplifier tubes 52, video amplifier and vertical oscillator tube 54, synchronizing signal separator tube 56, vertical output tube 58, horizontal oscillator tube 60, horizontal output tube 62, damper diode 64, sound detector tube 66, and audio amplifier tube 68.

The panel assembly 50 is based on the plated circuit chassis board 50*a* (FIGS. 5–8) and this is preferably a laminated board reinforced with glass fibers to provide the necessary strength so that it may properly support the various components which are secured thereto. The chassis board 50*a* is secured to the open type frame 75 which includes a back right angle member 75*a*, a front right angle member 75*b*, and respective left and right side channel members 75*c* and 75*d* (FIG. 2). The frame 75 forms the bottom side of the main frame support 35. Extending between the back and front members 75*a* and 75*b* are two cross members 75*e* and 75*f* which have respective raised portions 81 and 82 with insulating spacers 84 and 85 thereon. The top surfaces of the insulators 84 and 85 are in substantial co-planar relation with the top surfaces of channel members 75*c* and 75*d* so that both edges and two intermediate points of the chassis board 50*a* will be supported by the frame construction. Suitable threaded fasteners are used to retain the board 50*a* to the members 75*c*, 75*d*, 84 and 85.

The rear longitudinal edge of the chassis board 50*a* is fitted with a reinforcing rim 89 and this is positioned within a channel member 90 extending substantially the full length of the board. Member 90 extends downwardly to overlap the upstanding edge of member 75*a* to which it is secured by means of threaded fasteners.

*Multi-Connectors*

Along the upright edge of the angle member 75*b* are disposed the multi-connectors 95, 96 and 97. These are removably secured to member 75*b* by means of threaded fasteners and these multi-connectors are disposed so that the forward edge of the chassis board 50*a* extends within them to make electrical contact and to provide support along this chassis edge.

As shown in the sectional view of FIG. 8, the board 50*a* includes a plated conductor 101 on both sides thereof and this conductor engages the U-shaped connector clip 105 disposed in the multi-connector 97. The free ends of clip 105 are outwardly turned and these engage shoulders 110 of the insulator body of the multi-connector block in order to prevent the clip from moving when the board 50*a* is inserted. The block of multi-connector 97 with the clips removed, as illustrated in FIG. 8*a*, includes an integrally molded horizontal portion 114 dividing the clip retaining apertures in half and a plurality of integrally molded vertically extending spacers 116 to separate each of the identical clips, such as clip 105. The vertical spacers 116 do not extend to the edge of the clip retaining aperture and this provides a small shoulder 117 on both sides of the clip retaining aperture and this shoulder is engaged by projections of the clip in order to prevent inward movement thereof when the panel 50*a* is withdrawn.

The plated circuit conductors 101 on opposite sides of the chassis board 50*a* engage the U-shaped clip 105 as shown in FIG. 8. There is also a pair of spaced apertures 101*a* (FIG. 9) extending through the chassis board and the plated conductor 101 covers the sides of these apertures to insure electrical connection of all portions of conductor 101 with the clip 105. Mechanical rigidity for contact with conductor 101 along the edges of board is improved by filling the pair of apertures with solder 119 (FIG. 8). Immediately after filling these apertures with solder both surfaces of the contact conductor 101 are wiped so that no excess solder remains on the surfaces to reduce the contact area with the sides of clip 105. It should be recognized that a great number of the electrical connections to the panel assembly 50 is made to the multi-connectors 95–97 and that each of the connections must be mechanically and electrically firm in order that the receiver will satisfactorily withstand a long period of portable usage. In a preferable form of the multi-connector system the conductor 101 is copper plated and the clip 105 is cadmium plated. This composition of the circuit portions have been found satisfactory from the standpoint of preventing electrolysis and providing maximum contact life.

*Chassis Removal*

In order to remove the chassis board 50*a* from the multi-connectors 95–97, the manually operable release levers 125, 126 (FIGS. 2, 3) are provided at each side of the panel assembly. As best shown in FIGS. 5 and 6, the mechanism associated with release lever 126 includes a slide member 130, which is slidably mounted on the upper portion of the channel member 75*d*. Member 130 is positioned between the corner of the forward edge of chassis board 50*a* and the upright portion of the angle member 75*b*. A linking member 132 is pivotally secured to member 130 and extends rearwardly along the side of frame 75 to be pivotally secured to the release level 126. Lever 126 is pivotally mounted to the frame member 75*d* at a point below and to the rear of the pivotal fastening thereof to link 132. It may be observed that lever 126 extends outwardly from the pivotal engagement thereof with link 132 so that manual pivotal movement of lever 126 along the line 135 in FIG. 6 will cause member 130 to slide rearwardly on member 75*d* and to carry chassis board 50*a* therewith. As previously explained, this chassis board is supported on the upper portion of the channel member 75*d* on which sliding member 130 is mounted. A tension spring 138 extending between lever 126 and link 132 tends to bias the mechanism so that sliding member 130 is urged forward against the angle member 75*d* of the frame 75. The mechanism associated with release lever 125 is similar to that with lever 126 so that by simultaneous manual operation of the levers 125 and 126 the forward edge of the chassis board 50*a* is urged outwardly of the multi-connectors 95–97 to release the board and all of the electrical connections made by these multi-connectors. Obviously in preparation for such release of the panel assembly 50, the retaining channel 90 and the threaded fasteners securing the board to the frame are all removed.

*Circuits External to Panel Assembly*

Some of the receiver components and receiver stages are mounted on the frame support 35 externally of the panel assembly 50. These components and subassemblies are shown in FIGS. 2 and 3 and the circuitry for them is shown in FIG. 9. As clear in FIG. 2 the A.C. interlock 150 is mounted on the right of frame 35 and this is engageable with a suitable line cord connector affixed to the back panel 16 in accordance with standard television practice. A power supply subchassis 155 is secured centrally of the upper portion of frame support 35 and this subchassis supports elements such as electrolytic filter capacitor 157, rectifiers 158 and voltage doubler electrolytic capacitor 160, all with connection lugs exposed. The vertical output transformer 162 and the filter choke 164 are supported by the upper side of frame 35. Subchassis 155 also carries the circuit breaker 166 and the plug-type deflection yoke connector 170. The deflection yoke 174, which is supported on the neck of cathode ray picture tube 176, is coupled to its energizing circuitry entirely through the connector 170 to expedite removal or replacement.

An enclosed subhousing 180 is removably fastened to the frame support 35 and within this subhousing there is included the high voltage rectifier 182 and the horizontal output transformer 184. The subhousing 180 is for the purpose of physically isolating the high voltage section of the receiver in accordance with the usual television practices and the cover 180*a* is made removable for tube replacement and the like. This cover also forms a convenient surface for a circuit diagram 185 which corresponds to the diagram of FIG. 9, and which together with the chassis board conductor identification discussed subsequently herein, provides the receiver with a complete self-sufficient wiring circuit.

As shown in FIG. 9, the high voltage and low voltage power supply circuitry of the receiver is connected to the multi-connector 97 and in this way the components of subhousing 180 and the components supported by the subchassis 155 (FIG. 2) may all be assembled and pretested by the connections to the multi-connector 97.

Also as best shown in FIGS. 2 and 9, the enclosed and shielded tuner subassembly 190 is removably secured to the frame support 35 and is coupled to the panel assembly 50 by way of various leads which are connected to the multi-connector 96. This tuner assembly includes RF amplifier tube 192 and mixer-oscillator tube 193 as well as a shielded antenna conductor lead 194 which is arranged to be coupled to terminals (not shown) on the back panel 16 of the complete receiver and to antenna 21. The various base pins of the cathode ray tube 176 are coupled through a socket 197 and associated wire leads to the multi-connector 96. Thus, it can be noted that the lead connected to the multi-connector 96 essentially comprise the conductors for the tuner 190 in the cathode ray tube 176 thereby simplifying preassembly and testing of these portions of the television circuits.

The multiconnector 95 includes lead connections to the volume control 27, the contrast control 25, and the output transformer 200 (FIG. 9), which is mounted to the upper portion of frame support 35 adjacent the choke 164. Accordingly, these components may be preassembled and tested conveniently because of the connections to these elements which are all made to the multi-connector 95.

*Disassembly of Receiver Units*

In gaining access to the various receiver components to expedite service or repair, it should be noted that upon removal of a back panel 16 (FIG. 1) which is attached to the housing portion 14, the vacuum tubes of the receiver as well as the power supply components carried by sub-chassis 155 will all be readily available. Furthermore, test probes may be used on the many exposed conductors of the upper side of board 50*a* and the clips of multi-connectors 95–97. However, for more complete access to individual circuit conductors and test points, the housing portion 14 and the bezel 12 may be removed. As previously indicated, the housing portion 14 is secured to lugs 38 and at the bottom 14*a* to the frame support 35. The housing portion is also connected through a grounding network 210 to the tuner 190 and this may be released by a simple unclamping operation. Speaker 211 is fixed to housing portion 14 and this is disconnectable by plug-type leads when detaching the receiver cabinet.

With the housing and bezel and safety window 12 removed, the receiver appears as shown in FIG. 3. This bezel is retained by the insulated members 40 positioned on each side of frame support 35. The cathode ray tube 176 is surrounded at its widest portion by a mounting band 215 and this band includes brackets 215*a* for mounting the tube to the frame support 35 by means of threaded fasteners (see also FIG. 4). Accordingly, the picture tube 176 may be removed by release of the brackets 215*a* and unfastening of the socket 197 and the yoke connector 170 (FIG. 2).

As shown in FIG. 4, when the housing portion 41 and the bezel 12 have been removed and the receiver turned on its side, the conductors on the underside of the panel assembly 50, as well as all component lugs, are available through the open portions of the frame 75. Since cross members 75*e*, 75*f* (FIGS. 2, 7) are spaced from the board 50*a* which is supported by raised portions 81, 82, there is improved accessibility to conductors of the board under the cross members. Furthermore, when the bezel 12 has been removed, the connection terminals of the multi-connectors 95–97 are also available for test purposes. It may be observed that this provides a very convenient access to virtually all of the critical test points of the receiver which are all available within the plane of the bottom of the receiver and which are all essentially unobstructed for greatly simplifying the testing of a receiver while it is operative. In this respect, it has also been found helpful to utilize some of the terminals of the multi-connectors 95 and 96 solely for the purpose of test points. For example, as shown in FIG. 9, the chassis conductor 220 may be coupled to B++ in the receiver, the conductor 211 may be connected to the AGC potential applied to the intermediate frequency amplifier stages of the receiver, and conductor 222 may be coupled to the B+ network of the receiver. Accordingly, measurements of these relatively significant test points may be easily made at the exposed lugs 220*a*, 221*a* and 222*a* respectively (FIG. 4).

In order to further facilitate tracing of the circuitry of chassis board 50*a*, the plated wiring thereon is color coded. After application of the conductors to board 50*a*, a coating of melamine thermosetting plastic is applied for protection and this is masked from points where solder will later be applied for components. As representatively shown in FIG. 5 (by use of the linings for color of Trademark Rule of Practice 2.52(*e*)), the copper plated conductors such as conductor 225 are also overcoated with areas of red and yellow pigmented melamine with alkyd to prevent crazing, the conductors 229 and 230 are overcoated with red alkyd-melamine to indicate B+ leads, and conductors 232, 233 are overcoated with red and green alkyd-melamine to indicate plate leads. (Reference is also made to the supplement to the Home Furnishings Daily publication of October 20, 1959, for a showing of the receiver and the color coded panel.) In addition to color coding, this additional application of melamine further secures the plated conductors to the board. It should be noted that FIG. 5 shows a top view of the panel board 50*a* with all of the components removed for understanding of the present description. However, the conductors on the bottom side are also color coded similarly to facilitate circuit tracing. Furthermore, as exemplified by tracings 240, which are coatings of black ink applied on the top side of the board, the circuit conductors of the bottom side of the board are represented on the top side so that all of the circuit is visible from the top. Similarly, all of the conductors of the top side are traced in black ink on the bottom side of the board. Thus, as viewed from either side, a conductor may be completely traced without having to examine both sides of the board. It will be understood, of course, that various apertures in the board include plated sides so that a conductor can extend through the board from one side to the other and in some of these holes the various circuit components are soldered and others of the holes merely provide ventilation upwardly through the panel to dissipate heat generated by the various components. It will also be obvious that the louvers in the four sided housing portion 14 (FIG. 2) assist in ventilating the entire receiver.

As a further guide in facilitating the understanding and servicing of the receiver, the bottom side of chassis board of 50*a* includes tube type designations as well as the designation for at least one of the tube socket connections so that the various tube pins may be easily identified. As shown in FIG. 5, the plating on the bottom side of board 50*a* includes identification of the tube-type "12GC6" as shown in the plating 245 and the first socket pin is marked with the numeral 1 as shown in the plating 247. As an additional assistance to circuit testing, the various exposed terminals of the multi-connectors 95, 96 and 97 are all labeled with designations for each of the terminals as illustrated by labels 250–252 in FIG. 4. Accordingly, with the receiver positioned as shown in this figure, it is a simple matter to trace virtually the entire circuit of the chassis board from the bottom side thereof, and due to the color coding and circuit labeling, as well as the exposure of the great number of conductors, testing of the receiver can be easily and readily carried out by only removing the enclosing housing portions of the receiver cabinet.

Furthermore, as has been previously explained, it is a simple matter to withdraw the panel assembly 50 for additional study or component replacement and this is accomplished by releasing the threaded fasteners holding channel member 90 to angle 75*a* (FIGS. 2 and 3) to free the rear edge of the chassis assembly, and by releasing the threaded fasteners retaining the assembly on the channels 75*c* and 75*d* and the insulated spacers 84 and 85. When the chassis has been thus freed mechanically from the frame 75, the release levers 125, 126 are operated to disconnect the chassis board from the multi-connectors 95–97. There are also further plug or clip type connections which must be released to completely free the panel assembly 50 as a unit which is entirely free of the remainder of the receiver. These include the disconnecting of the cable 260 (FIGS. 9 and 3) which extends between tuner 190 and the panel assembly, the releasing of the tube cap connections 261 and 262, which extend between the horizontal output transformer 184 and the tubes 62, 64 respectively, the release of a clip connector lead 264 extending between the contrast control 25 and a lug (not shown) on the panel assembly, and the release of clip lead 265 which extends between the focus electrode of picture tube 176 and a lug on the chassis assembly (not shown). Accordingly, it may be seen that the entire panel assembly 50 is removable as a unit from the receiver without unsoldering any connections and entirely through the simple operations of releasing threaded fasteners, operating the chassis release levers 125, 126, and unplugging a minimum number of additional clip leads connected to the chassis. In this form the very light weight and relatively small panel assembly 50 may be easily handled for service study and component replacement.

As shown in FIG. 4*a*, it is also possible to render the receiver fully operative for test purposes with the panel assembly 50 entirely removed from the receiver frame support 35. This is accomplished by first freeing the panel assembly as described immediately above and then releasing the threaded fasteners retaining the multi-connectors 95–97 (FIGS. 5, 7), and then reconnecting the various plug type connectors to the panel assembly. The leads 95*a*, 96*a* and 97*a* (FIGS. 2, 4*a*) extending from the components supported by frame 35 to the respective multi-connectors are all made long enough so that the multi-connectors can be withdrawn to connect the chassis as is shown in FIG. 4*a*. Similarly, the leads 260—265 (FIG. 2) are of sufficient length to permit connection with the panel assembly positioned as shown in FIG. 4*a*.

FIGS. 9 and 10 show respective bottom and back views of the receiver with the enclosing back 16 removed and the frame 75 and panel assembly 50 fastened in a servicing position. With the receiver in this condition, it is convenient to make various electrical tests of the receiver while it is operating and also to adjust or align any of the various receiver stages since the components on the top side of the chassis board 50*a* are all fully accessible. In order to provide this receiver setup it is merely necessary to remove the enclosing back 16 (FIG. 1) and to turn the receiver on its side as shown in FIG. 9 for removal of four threaded fasteners available through apertures 270 in the housing bottom side 14*a*. Such threaded fasteners secure the frame 75 to the inwardly turned flanges 35a of the frame support 35 (see also FIG. 2). The assembled frame 75 and the panel assembly 50 are then partially removed from the receiver housing so that the frame 75 can be refastened to the flanges 35a through the rearwardly positioned apertures 270 in the bottom side 14a. This firmly supports the panel assembly and frame as shown in FIGS. 9 and 10 with the apparatus over half removed from the receiver housing. As previously indicated various connector leads extending to the panel assembly are long enough that these need not be removed and the receiver is fully operative while also fully accessible for service purposes. It should be apparent that with the receiver positioned as shown in FIG. 9, the entire panel assembly 50 and associated frame 75 may be unfastened from the frame support 35 and then withdrawn completely from the housing to provide an operative receiver which is even more fully accessible, although not mechanically attached to the receiver housing.

Accordingly, it may be seen that the herein described television receiver is constructed in a compact form with all of the receiver components positioned closely about the back surface of the picture tube 176, and that the receiver is of substantial mechanical construction to withstand service in portable use. Furthermore, the enclosing housing of the receiver is of the type which may be easily and quickly removed to provide access to components of the receiver. The components are all positioned in a way such that they are readily accessible for servicing or replacement and particularly the components such as tubes and power supply elements are disposed in unobstructed positions so that they can be easily reached. Moreover, the receiver is constructed in such a way that the circuitry of the plated circuit panel assembly can be readily traced, even when the panel is supported within the receiver, and a great number of circuit portions which can be viewed for test purposes are all exposed in a convenient manner with all or part of the outer housing removed. Additionally, the receiver is arranged for full operation with the panel assembly removed and it includes very simple and rapid means for entirely freeing the panel assembly from the receiver for component replacement and the like.

We claim:

1. A television receiver assembly including in combination, a four sided support frame, a cathode ray tube removably secured within said frame and surrounded by the sides thereof, housing means including a back and sides removably affixed to said frame for enclosing said receiver, a tuner subassembly supported by said frame, a high voltage power supply subassembly supported by said frame, a low voltage power supply supported by said frame with the component conductors thereof exposed with said back removed, a single plated circuit panel assembly removably supported by one side of said frame and carrying on the inner surface thereof receiver components comprising substantially all the stages of said receiver exclusive of said subassemblies, and a plurality of plug type connectors forming the sole means electrically coupled to said panel assembly.

2. An electronic chassis assembly including in combination, a frame, a plated circuit panel having components affixed to one surface thereof and having component connector lugs exposed on an opposing surface of said panel, said panel including electrical conductors on said surfaces thereof adjacent a panel edge, said panel further having at least one aperture with electrically conductive sides extending between said conductors, said frame having a frame portion adapted to peripherally engage said panel to provide unobstructed access to a surface thereof, a plurality of plug-type connectors forming the sole means for electrical connections to said panel, at least one of said plug-type connectors comprising an insulating block having a clip retaining aperture, a U-shaped electrically conductive terminal clip supported in said aperture and having two opposing sides spaced to receive said panel therebetween and contact said conductors, coatings of different colors applied on at least some of said conductors for circuit identification, a visual pattern exposed on a surface of said panel and corresponding to said conductors on the opposite surface to permit testing and circuit tracing of all said conductors from one surface of said panel, a component subassembly supported by said frame in spaced relation from said panel, a plurality of conductor leads coupled through said plug-type connectors and between said subassembly and said panel, and manually operable means carried by said frame and engageable with said panel for simultaneously disconnecting a plurality of said connectors.

3. An electronic chassis assembly including in combination, frame means having opposing side members and a longitudinal member extending therebetween, a connector receptacle supported on said longitudinal member and aligned with said side members, a plated circuit panel having components affixed to one surface thereof and having conductor portions along an edge thereof, means for removably securing said panel on said side members with said conductor portions engaging said connector receptacle and said frame means peripherally engaging said panel to support the same, a component subassembly supported by said frame means in spaced relation from said panel, a plurality of conductor leads coupled to said connector receptacle and between said subassembly and said panel, a slider member slidably mounted on each of said side members and engageable with said edge of said panel, and manually operable means for moving said slider members away from said connector receptacle for disengaging said panel from said connector receptacle.

4. A panel connector and support assembly including in combination, frame means having a front member and spaced opposing side members, a plated circuit panel having a surface disposed on said frame members, means for removably securing said panel to said frame means to form a rigid structure for supporting said panel, said panel having a plurality of conductor portions along top and bottom surfaces thereof electrically connected to circuitry carried thereby, a multiconnector secured to said front member and having a plurality of friction contacts for electrically and mechanically gripping said conductor portions, a slider member slidably mounted on each of said side members and engageable with said one edge of said panel, a lever pivotally mounted on each of said side members and spaced from said front member, and linking members joining said slider members to respective ones of said levers so that manual operation of said levers moves said slider members against said panel for disengaging said panel from said multiconnector.

5. In a television receiver assembly, a rectangular frame having a plurality of spaced support ledges with open areas therebetween, further frame means for supporting said rectangular frame with said support ledges facing inwardly of the television receiver assembly, a plurality of multiple connector receptacles removably affixed to said further frame means along one side of said rectangular frame and positioned in alignment with said support ledges, a plated circuit chassis assembly removably affixed on said support ledges and having edge connectors thereof intercoupled with said multiple connector receptacles to provide an operative receiver with said multiple connector receptacles and said chassis assembly detached from said frame means and said frame, said chassis assembly having components carried thereby only on the inward side thereof and having electrical conductors on the other side thereof accessible through the open areas of said rectangular frame, removable enclosure means for said receiver assembly, tuner and power supply means carried by said further frame means, and a first group of conductors connected between said tuner means and one of said multi-connector receptacles and a further plurality of conductors connected between said power supply means and a further one of said multiple connector receptacles.

6. A television receiver assembly including in combination, a four sided rectangular frame, a cathode ray tube removably secured within said frame, housing means removably affixed to said frame and enclosing said frame and said cathode ray tube, said frame having a side portion with coplanar ledge supports, a plurality of connector receptacles removably affixed on said side portion in aligned relation with said ledge supports and adjacent the screen area of said cathode ray tube, a plated circuit chassis assembly removably affixed upon said ledge supports and having conductors on one edge engaged with said connector receptacles, manually operable means for disengaging said chassis assembly conductors and said connector receptacles, said chassis assembly including electrical components interconnected thereon and forming a plurality of stages of the receiver, a tuner and power supply assembly supported by other portions of said frame, and cable connectors extending between said tuner and power supply assembly and said connector receptacles whereby said chassis assembly is removable from said frame and connector receptacles for repair, and said chassis assembly and said connector receptacles are removable to provide a fully operative disassembled television receiver.

7. A television receiver assembly including in combination, a three sided rectangular frame, a further frame portion forming a fourth side for said frame, housing means surrounding said frame and said frame portion, a cathode ray tube removably secured to said frame and facing outwardly of a front side of said receiver assembly, a removable back for said housing means, removable fastening means for securing said frame portion to said frame, said housing means having apertures therein through which said fastening means are releasable externally of said housing means, tuner and power supply assemblies supported by said frame, a plated circuit chassis assembly affixed to said frame portion, and extended conductor leads coupled between said plated circuit chassis assembly and said power supply and tuner assemblies and forming the sole electrical conduction means coupled externally of said plated circuit chassis assembly whereby said frame portion and said plated circuit chassis assembly may be removed by removal of said fastening means and said back panel to provide a disassembled operative television receiver.

References Cited in the file of this patent

UNITED STATES PATENTS

| | | |
|---|---|---|
| 2,441,960 | Eisler | May 25, 1948 |
| 2,474,988 | Sargrove | July 5, 1949 |
| 2,514,246 | Knox | July 4, 1950 |
| 2,735,077 | Jesse | Feb. 14, 1956 |
| 2,752,413 | Junkins | June 26, 1956 |
| 2,793,091 | Christians | May 21, 1957 |
| 2,802,188 | Badders | Aug. 6, 1957 |
| 2,853,689 | Jackson | Sept. 23, 1958 |
| 2,857,558 | Fiske | Oct. 21, 1958 |
| 2,864,977 | Witt | Dec. 16, 1958 |
| 2,882,511 | Mason | Apr. 14, 1959 |
| 2,896,201 | Ackerman | July 21, 1959 |
| 2,915,680 | Kong | Dec. 1, 1959 |
| 2,922,997 | Solheim | Jan. 26, 1960 |
| 2,930,939 | Swanson | Mar. 29, 1960 |
| 2,947,811 | Archer | Aug. 2, 1960 |
| 3,005,049 | Yoder | Oct. 17, 1961 |
| 3,029,365 | Plesser | Apr. 10, 1962 |

FOREIGN PATENTS

| | | |
|---|---|---|
| 742,807 | Great Britain | Jan. 4, 1956 |